United States Patent [19]

Reyman

[11] Patent Number: 5,190,191
[45] Date of Patent: Mar. 2, 1993

[54] APPARATUS FOR MEASURED AND UNMEASURED DISPENSING OF VISCOUS FLUIDS

[76] Inventor: Mark E. Reyman, 246 Centre Ave., Apt. 5N, New Rochelle, N.Y. 10805

[21] Appl. No.: 668,959

[22] Filed: Mar. 13, 1991

[51] Int. Cl.⁵ ............................................. G01F 11/00
[52] U.S. Cl. ................... 222/256; 222/278; 222/309; 222/380; 222/383; 222/388
[58] Field of Search ............. 222/256, 259, 260, 278, 222/309, 380, 383, 386, 387, 388

[56] References Cited

U.S. PATENT DOCUMENTS

| | | | |
|---|---|---|---|
| 703,250 | 6/1902 | Grimm | 222/387 |
| 1,084,537 | 1/1914 | Clark | 222/387 |
| 1,119,033 | 12/1914 | Paddock | 222/387 X |
| 1,679,849 | 8/1928 | Bell | 222/326 X |
| 1,894,274 | 1/1933 | Jacques | 222/256 |
| 2,123,712 | 4/1938 | Clark | 222/326 X |
| 2,435,647 | 2/1948 | Engseth | 222/256 X |
| 2,607,627 | 11/1952 | Gregg et al. | 222/325 |
| 2,709,436 | 5/1955 | Lynn | 222/386 X |
| 2,724,385 | 11/1955 | Lockhart | 222/386 X |
| 2,793,792 | 4/1957 | Pilkington | 222/256 |
| 3,735,900 | 5/1973 | Gores | 222/386 X |
| 3,881,360 | 5/1975 | Jurado | 222/309 X |
| 4,068,974 | 1/1978 | Meyer et al. | 222/325 X |
| 4,090,639 | 5/1978 | Campbell et al. | 222/309 X |
| 4,236,651 | 12/1980 | Meyer et al. | 222/383 X |
| 4,323,175 | 4/1982 | Eckert | 222/387 X |
| 4,444,335 | 4/1984 | Wood | 222/309 X |
| 4,702,398 | 10/1987 | Seager | 222/326 |
| 4,708,260 | 11/1987 | Siegal et al. | 222/563 X |
| 4,817,831 | 4/1989 | Theisen | 222/563 X |
| 4,856,679 | 8/1989 | Czech | 222/256 X |
| 4,925,063 | 5/1990 | Ali et al. | 222/563 X |
| 4,958,754 | 9/1990 | Dennis | 222/383 |
| 4,964,539 | 10/1990 | Mueller | 222/563 X |
| 5,040,702 | 8/1991 | Knickerbocker et al. | 222/380 X |

FOREIGN PATENT DOCUMENTS

| | | | |
|---|---|---|---|
| 96963 | 12/1963 | Denmark | 222/256 |
| 268332 | 1/1928 | United Kingdom | 222/256 |

Primary Examiner—Andres Kashnikow
Assistant Examiner—Joseph A. Kaufman
Attorney, Agent, or Firm—David M. Carter

[57] ABSTRACT

A viscous fluid dispenser is provided including a housing enclosing a pressurizable viscous fluid reservoir connected to a collapsible measuring chamber. A valve is connected therebetween and can be activated to fill the chamber on demand. The dispenser will discharge a premeasured quantity of fluid either proximally or remotely and direct dispensing of unmeasured quantities without modification.

14 Claims, 8 Drawing Sheets

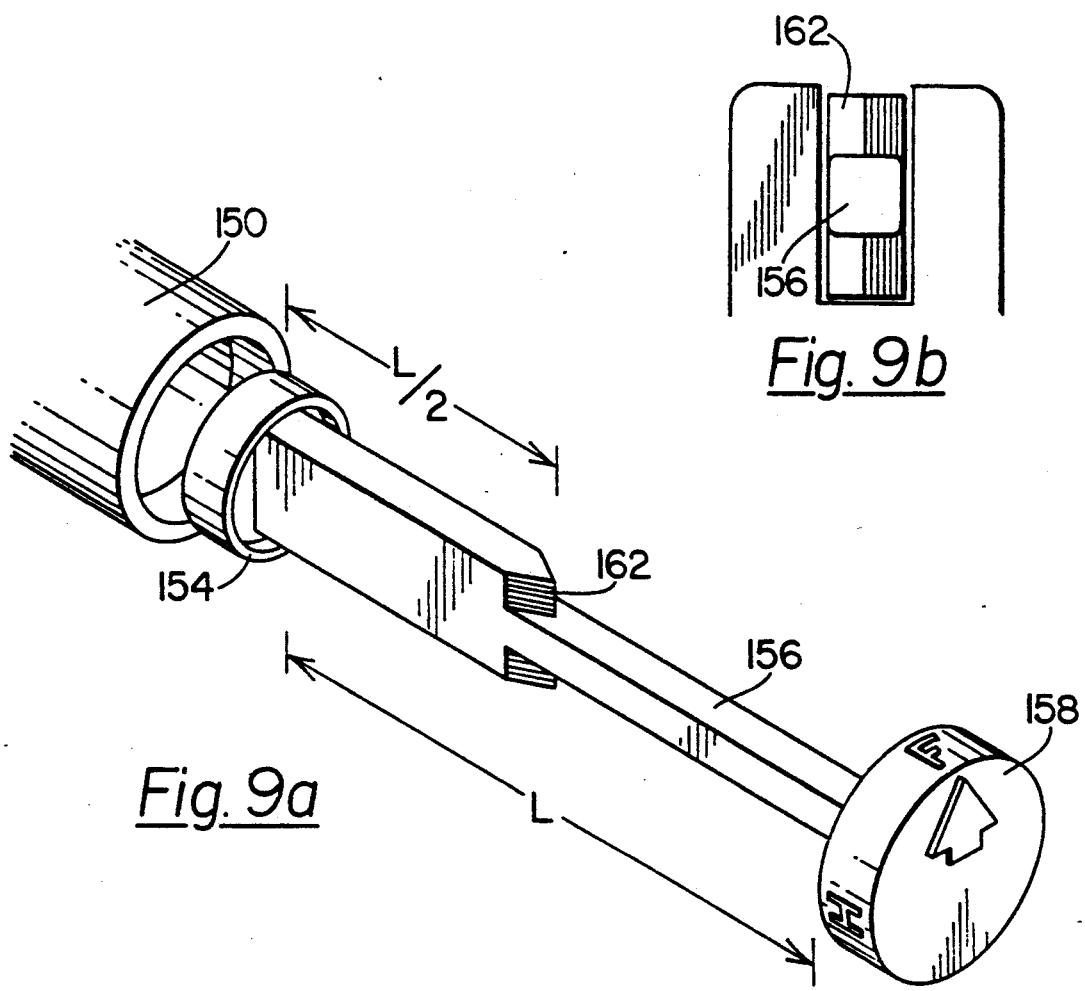
*Fig. 9b*
*Fig. 9a*
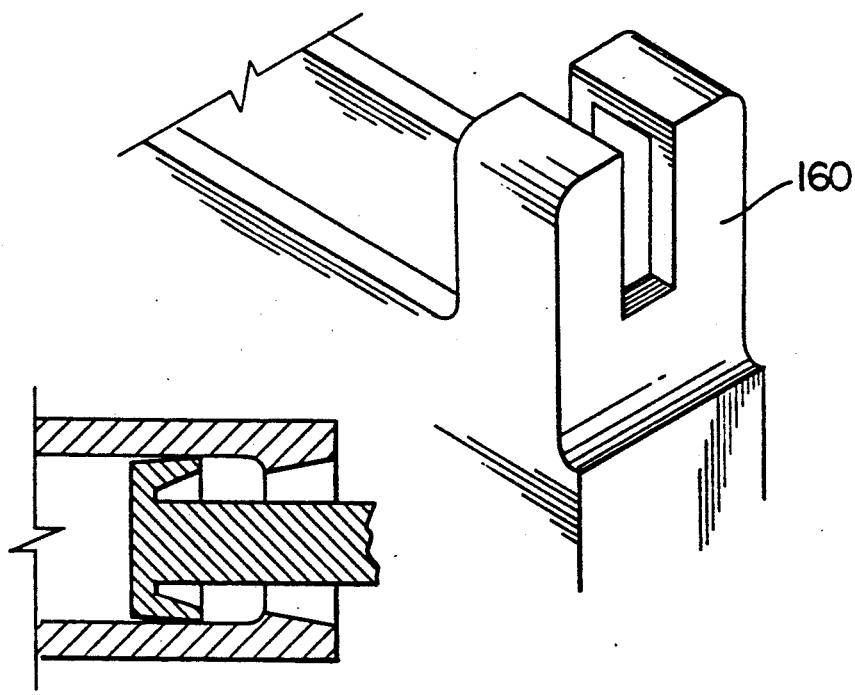
*Fig. 9c*

APPARATUS FOR MEASURED AND UNMEASURED DISPENSING OF VISCOUS FLUIDS

FIELD OF THE INVENTION

The present invention relates to apparatus for dispensing viscous fluids and, in particular, to dispensers capable of dispensing both measured and unmeasured quantities of viscous fluid.

BACKGROUND OF THE INVENTION

The most common dispensers for viscous fluids today are the venerable collapsible tube containers. These containers are usually fabricated of soft metal or plastic and have a screw cap to seal the tube. The fluid is dispensed by applying pressure to the tube from the bottom until a sufficient quantity is expelled. These dispensers have been commonly used on viscous fluids such as toothpaste, creams, pastes, jellies, etc. However, such dispensers present some problems for applications such as, for example, medical applications or contraceptive jellies and creams where a measured quantity of the fluid must be dispensed or a quantity of fluid is to be applied to remote locations not readily visible or accessible. Since conventional collapsible tubes have no inherent structure for providing predetermined quantities, extension tubes or syringes must be incorporated to avoid spillage and to insure correct application. See, for example, U.S. Pat. No. 2,709,436 to Lynn. Where simple extension tubes are used, expulsion of the fluid must be controlled by the user and the quantity must be judged visually.

Various other structure is known in the art for dispensing viscous fluids. These include syringes, spring loaded dispensers, pneumatic dispensers and screw-type dispensers. Syringes are commonly known in the art but require separate structure or elaborate designs. See, for example U.S. Pat. No. 2,793,792 to Pilkington.

Spring loaded dispensers, pneumatic dispensers and screw-type dispensers employ a means for applying pressure to a rigid container which exerts a force to drive the viscous fluid out of the container. See. e.g. U.S. Pat. Nos. 1,119,033 to Paddock, 703,250 to Grimm, 1,084,537 to Clark and 4,323,175 to Eckert. These dispensers are hampered by their difficulty in conveniently dispensing a premeasured quantity of viscous fluid at both proximate and remote locations.

OBJECTS AND STATEMENT OF THE INVENTION

It is therefore an object of the present invention to provide an improved means of dispensing and delivering both measured and unmeasured quantities of a viscous fluid for a wide variety of applications.

Another object of the present invention is to provide an improved dispenser and delivery system for self-application of both premeasured and unlimited quantities of a viscous fluid.

A further object of the present invention is to provide a dispenser which is capable of automatically measuring a predetermined quantity of a viscous fluid and easily dispensing that fluid on demand.

The present invention provides a unique and novel dispenser for use with viscous fluids such as contraceptive jellies, creams, pastes and viscous medications. The dispenser comprises a housing with a pressurizable fluid reservoir for holding a quantity of viscous fluid therein. Pressure is applied to the fluid reservoir by any one of a wide variety of known structure including spring-loaded plungers, screw-type or pneumatic plungers, etc.

A valve means is provided to interconnect a dispensing chamber with the pressurizable fluid reservoir. This fluid reservoir may be integral with the dispenser housing or may be in the form of separate replaceable cartridges which fit within the housing.

The dispensing chamber includes a conduit having an atmospheric opening at a distal end thereof and communicating with a collapsible measuring chamber at the proximal end. The atmospheric opening is provided with a closure cap when not dispensing fluid. The collapsible measuring chamber is preferably of the syringe type and may be releasably fixed within the housing for dispensing viscous fluid to a location remote from the dispenser housing.

The measuring chamber is normally in the collapsed position with the plunger in the forward position. The closure cap serves to seal the dispensing chamber until dispensing is desired. In operation, the valve means is opened allowing viscous fluid from the pressurized fluid reservoir to pass into the conduit and fill the collapsible measuring chamber, driving the plunger to the retracted position. Once the conduit is filled, the valve means is closed and the closure cap is opened allowing the measured amount fluid to be dispensed by driving the plunger to its full forward position. The dispenser is now ready for further use. Where a releasable measuring chamber is used, the filled chamber is detached from the housing and the fluid contained therein remotely dispensed as desired.

Unlimited dispensing of viscous fluid is accomplished by locking the measuring chamber in the collapsed position, opening the closure cap and opening the valve means. This allows pressurized fluid to pass from the reservoir, through the conduit and out the atmospheric opening so long as the valve means is biased open. In this way, the entire fluid reservoir may be emptied at will.

In preferred embodiments of the present invention designed for use with contraceptive fluids, the housing may be further provided with storage compartments for example to contain a prophylactic such as, for example, a condom, a diaphragm, etc.

BRIEF DESCRIPTION OF THE DRAWINGS

The above and other objects, features and advantages of this invention will be apparent in the following detailed description of a preferred embodiment, especially when taken in conjunction with the accompanying drawings.

FIGS. 9 A-C show an alternate embodiment of the measuring chamber of the present invention capable of varying the measured amount of fluid retained by the measuring chamber.

DETAILED DESCRIPTION OF PREFERRED EMBODIMENTS

Figure 1:
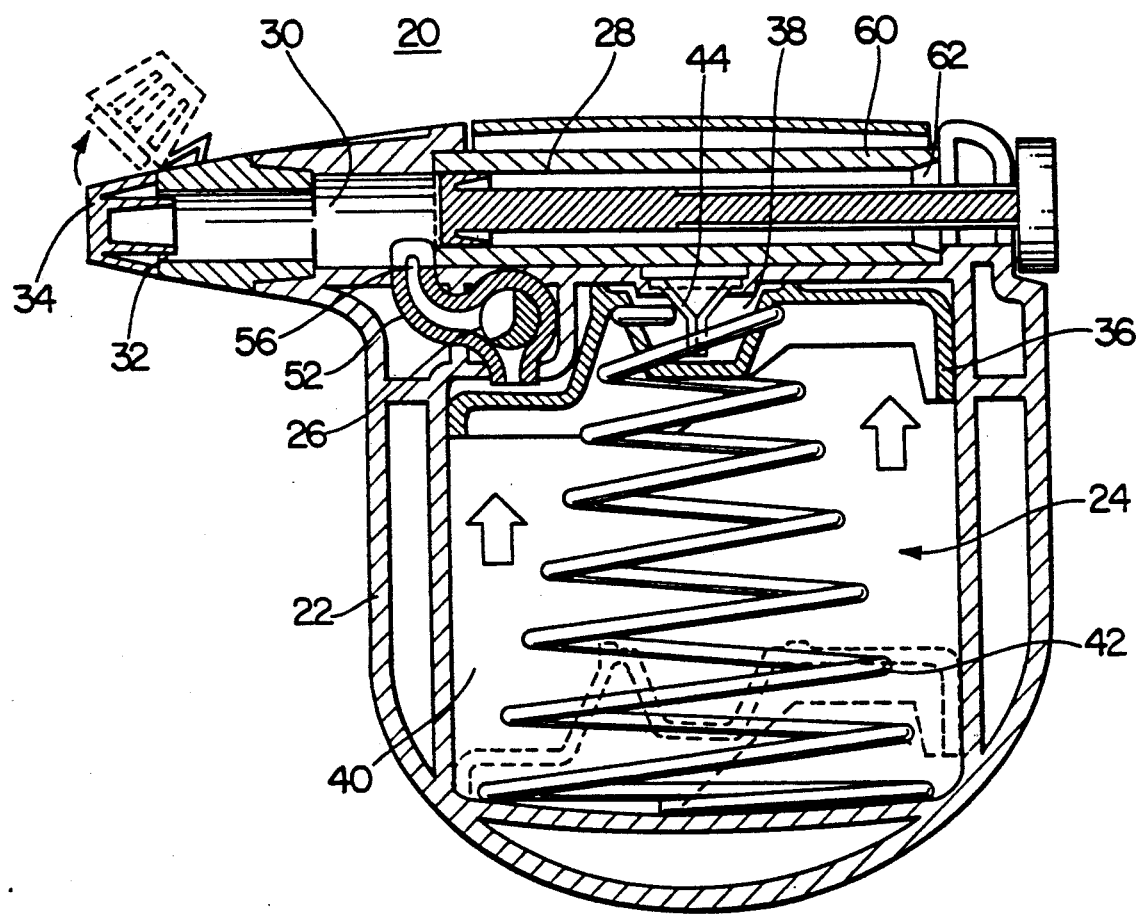
FIG. 1 is a side view, in cross-section, showing a preferred embodiment of the present invention having an integral spring pressurized fluid reservoir and an integral measuring chamber.
Figure 2:
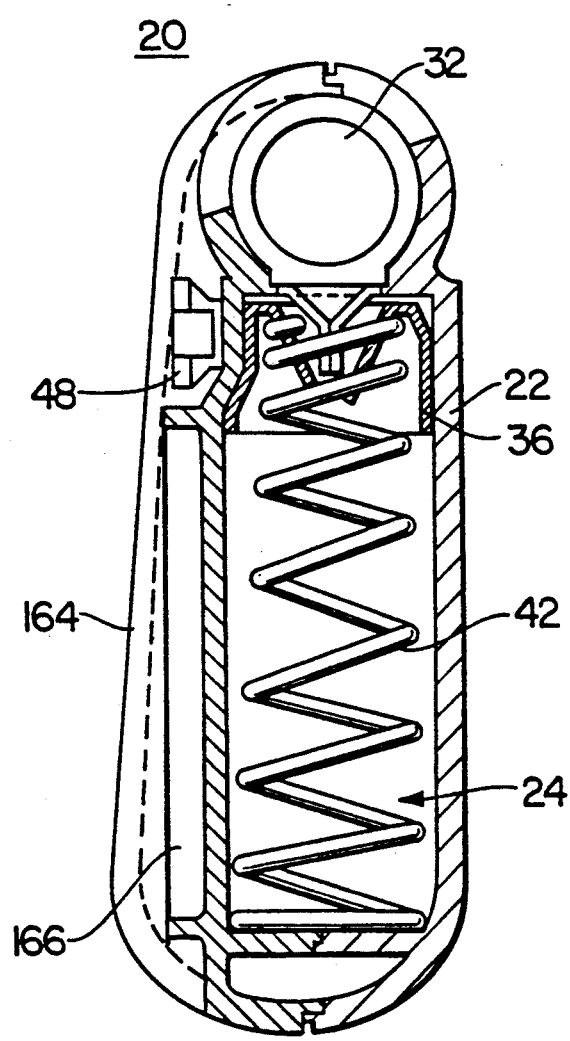
FIG. 2 is a frontal view, in cross-section, of the embodiment of FIG. 1.

Referring now to the drawings, and in particular to FIGS. 1-2, there is shown a viscous fluid dispenser in accordance with a preferred embodiment of the present invention designed for use in dispensing contraceptive jelly. The dispenser, shown generally at 20, includes a housing 22, a pressurized fluid reservoir 24, valve means 26, measuring chamber 28, conduit 30, atmospheric opening 32 and closure cap 34.

The fluid reservoir 24 comprises a head portion 36 dividing the reservoir in a fluid containing compartment 38 and a pressure applying compartment 40. In this embodiment, pressure is applied to the fluid through head portion 36 by coiled spring 42. This spring 42 serves to drive head member from a filled position (shown in phantom) to an empty position. One way valve 44 is provided adjacent the top of reservoir 24 to permit filling with fluid.

Figure 7:
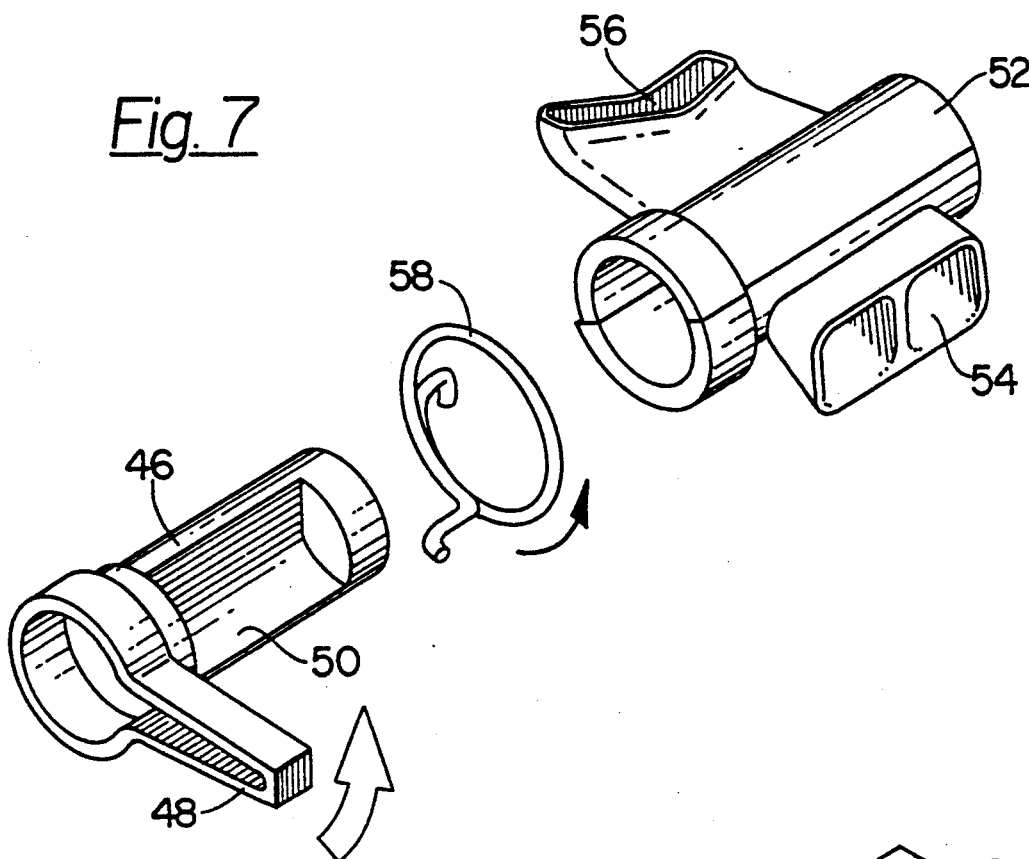
FIG. 7 is an exploded view in perspective of a valve means for use in the embodiments of FIGS. 1-4.
Figure 8B:
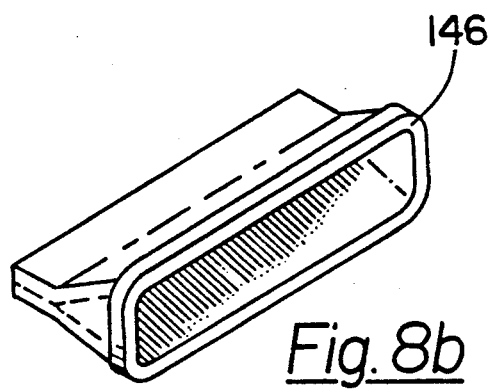
FIG. 8 A-C are one way resilient valves for use in the embodiments of the present invention.
Figure 8A:
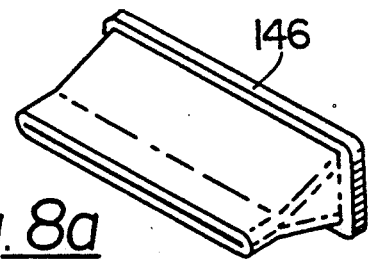
Figure 8C:
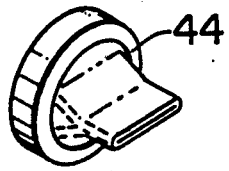

Valve means 26 is disposed between reservoir 24 and conduit 30 to provide a flow of viscous fluid upon demand. Referring to FIG. 7, the valve means comprises substantially cylindrical member 46 disposed in a housing 52, said cylindrical member being rotatable between an open and a closed position. Selector tab 48 is attached to a distal end of cylinder 46 to facilitate rotation thereof. A radial segment opening 50 is provided in a longitudinal surface of the cylinder member 46 such that, in the open position a clear passage is formed between opening 54 and opening 56 of housing 52 to allow for a flow of pressurized viscous fluid therethrough. In the closed position, the passage is blocked by the cylinder member to prevent flow. Where desired, cylinder member 46 may be provided with spring 58 to spring load the cylinder member to the closed position to prevent accidental fluid discharge.

Referring again to FIGS. 1 and 2, the measuring chamber 28 is preferably in the form of a syringe having a tubular housing 60 with a longitudinally movable plunger 62 therein. The tubular housing 60 is open at a distal end thereof and communicates with conduit 30 formed in housing 22. Conduit 30 connects with atmospheric opening 32 and opening 56 of housing 52. Closure cap 34 is provided to close atmospheric opening 32 prior to dispensing and open (shown in phantom) when fluid is to be dispensed.

In operation, closure cap 34 is positioned to close atmospheric opening 32 and selector tab 48 is biased to the open position. Viscous fluid flows through openings 54 and 56 in housing 52 to fill conduit 30. Thereafter, the fluid progressively forces plunger 62 to the retracted position as the fluid fills tubular housing 60. Once the conduit 30 and tubular housing 60 of measuring chamber 28 are filled by a predetermined amount of fluid, valve means is closed and the dispenser 20 is ready to be discharged. The closure cap 34 is opened and plunger 62 is driven forward to expel the fluid contained in measuring chamber 28 and conduit 30 out of atmospheric opening 32.

Figure 3:
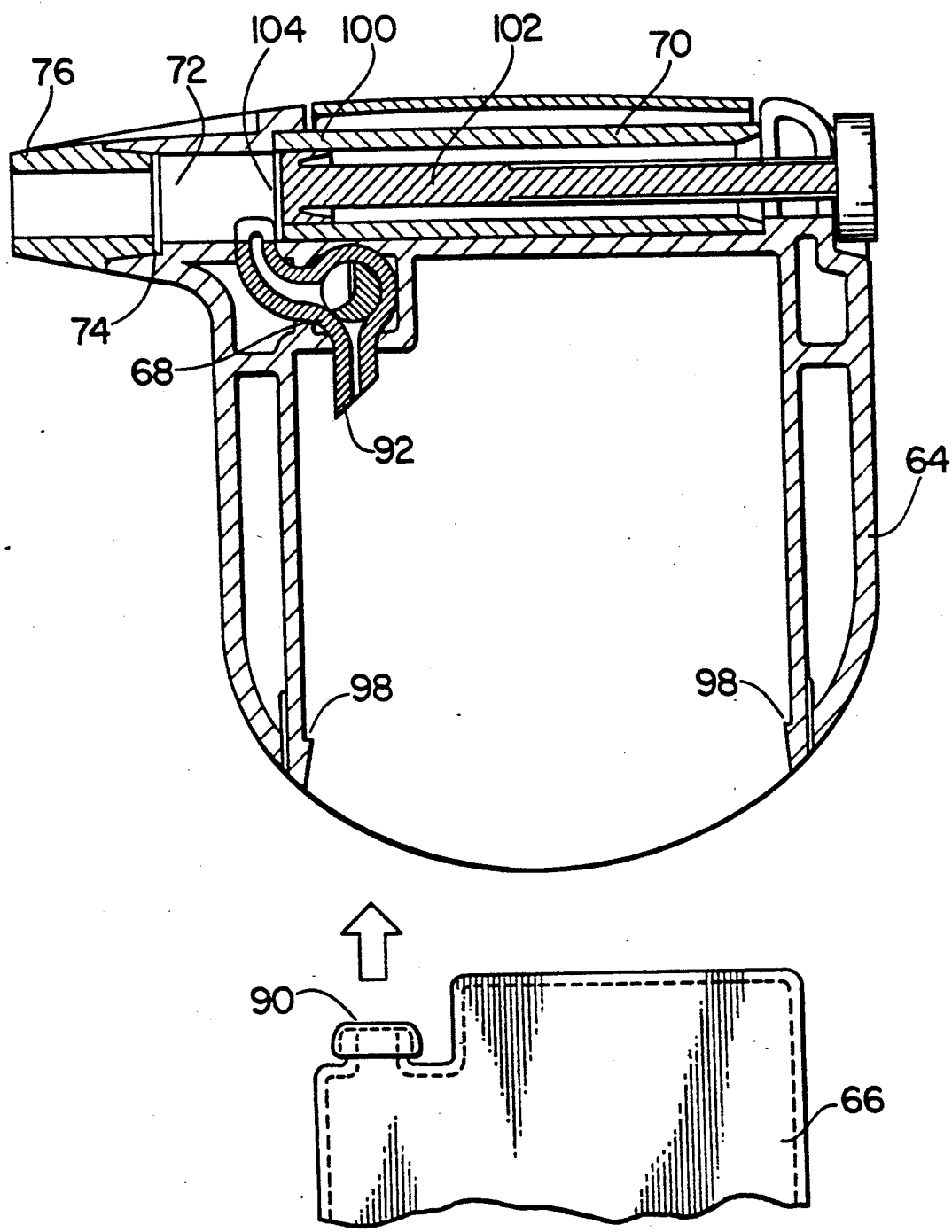
FIG. 3 is a side view, in cross-section, showing a second preferred embodiment of the present invention having a replaceable pressurized fluid reservoir and a releasable measuring chamber.
Figure 4:
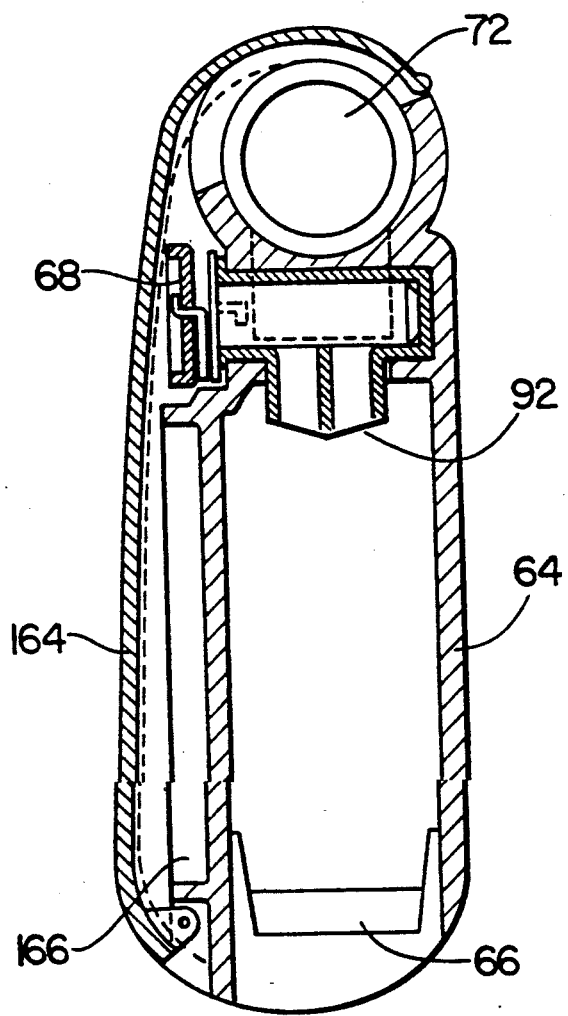
FIG. 4 is a frontal view, in cross-section, of the embodiment of FIG. 3.
Figure 5:
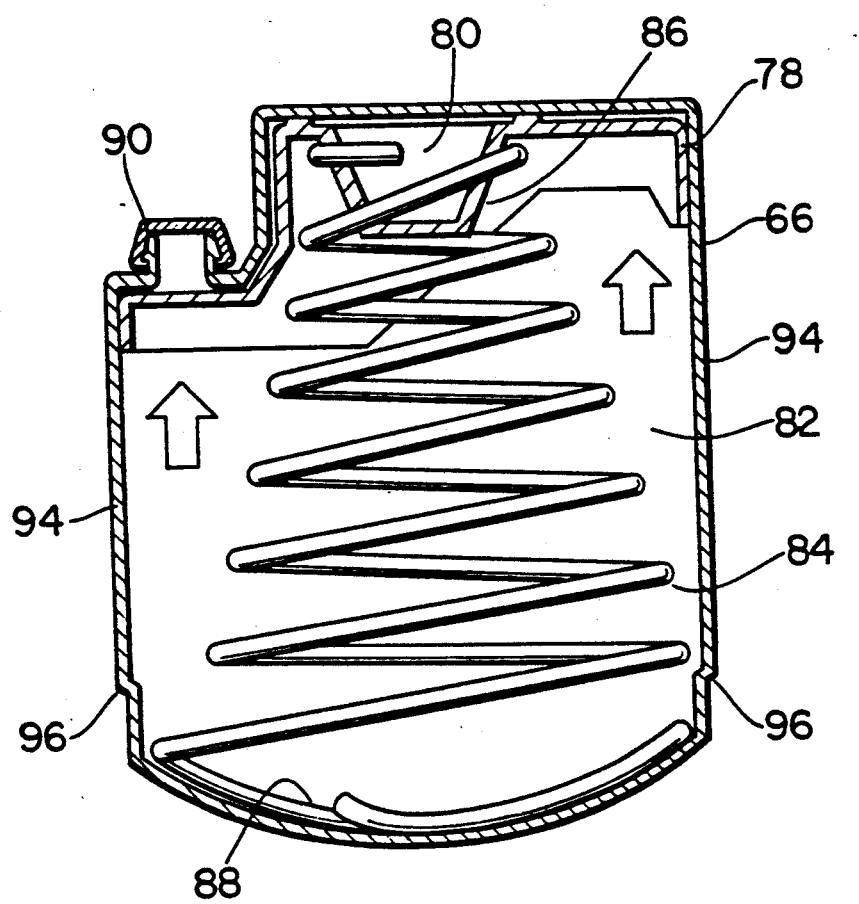
FIG. 5 is a side view, in cross-section, showing an embodiment of the replaceable cartridge of FIGS. 3 and 4.

Referring now to FIGS. 3-5, a second preferred embodiment of the present invention is shown. This embodiment is substantially similar to the dispenser shown in FIGS. 1-2 with the exception that the reservoir is replaceable and the measuring chamber is releasably fixed in the housing. This embodiment comprises a housing 64, a replaceable reservoir 66, valve means 68, releasable measuring chamber 70, conduit 72, atmospheric opening 74 and closure cap 76.

The replaceable cartridge reservoir 66, shown in FIG. 5 includes a head portion 78 separating a fluid containing compartment 80 and a pressure applying compartment 82. Pressure is applied by means of coil spring 84 which engages projection 86 extending below head portion 78 and floor portion 88 of pressure applying compartment 82. When filled with fluid, coil spring 84 is compressed effectively pressurizing said fluid. A pierceable opening 90 is position on a top portion of the reservoir 66 and is engageable with a piercing structure 92 of valve means 68. Sidewalls 94 are provided with engaging ledges 96 which interlock with projections 98 located on the interior of housing 64 to receive and maintain the replaceable cartridge reservoir 66 in position within the housing 64.

The releasable measuring chamber 70 is substantially the same as the measuring chamber 28 of the embodiment shown in FIGS. 1-2. A tubular housing 100 containing plunger 102 is releasably attached to housing 64 such that the open end 104 of tubular housing 100 is in fluid communication with conduit 72.

To use this embodiment, a replaceable cartridge reservoir 66 is inserted into housing 64 such that piercing structure 92 pierces opening 90 and ledges 96 engage projections 98. Valve means 68 is biased open to allow fluid flow into conduit 72 and to progressively fill releasable measuring chamber 70 thus driving plunger 102 from its compressed position to a retracted position. Once the conduit 72 and chamber 70 are filled, valve means 68 is closed and the dispenser is ready to be discharged. At this point, the fluid may be dispensed as in the embodiment of FIGS. 1-2 above. Alternatively, the releasable measuring chamber 70 can be removed from housing 64 and taken to a remote location for expulsion of the fluid.

Figure 6:
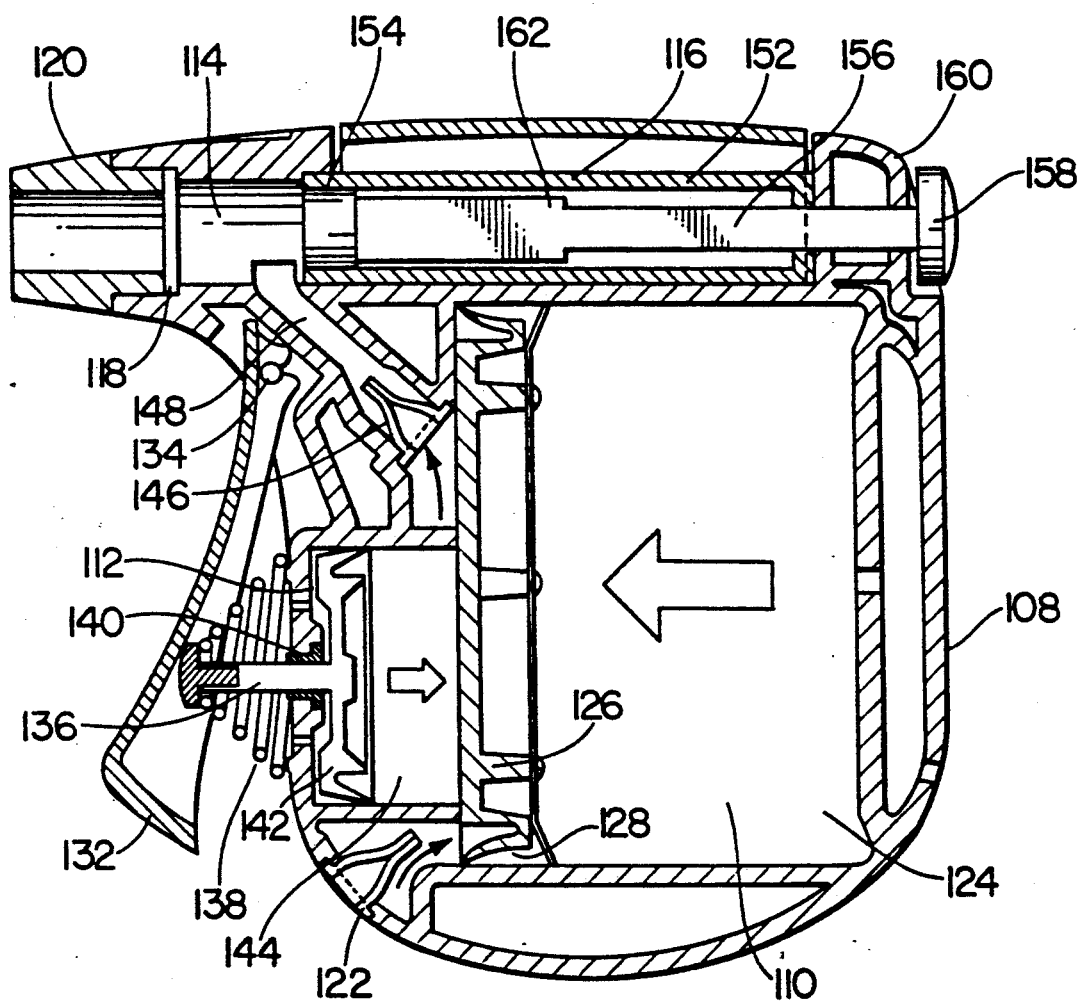
FIG. 6 is a side view, in cross-section, showing a third preferred embodiment of the present invention having a refillable integral fluid reservoir.

A third embodiment of the present invention is shown in FIG. 6. The dispenser, shown generally at 106 comprises a housing 108 containing a refillable fluid reservoir 110, a trigger operated pump assembly 112, a conduit 114 connecting a multidose releasable measuring chamber 116 with an atmospheric opening 118, and a closure cap 120.

Refillable fluid reservoir 110 includes a resilient one way valve 122 communicating with a fluid containing compartment 124 to allow viscous fluid to fill the reservoir 110. Head portion 126 with fluid seal wiper 128 serves to seal and retain the viscous fluid within compartment 124 and follows distally as fluid is expelled from the compartment 124. Brake member 130 is angled so as to prevent proximal motion of the head portion 126.

Pump assembly 112 comprises a trigger 132, pivotally mounted to the housing at pivot pin 134, for longitudinally driving piston member 136 in the proximal direction through pressure chamber 144. Compression spring 138 serves to return the piston member 136 when trigger 132 is released. Piston member 136 is guided through housing 108 into pressure chamber 144 by fluid seal 140 and has a head portion 142 for creating an internal pressure within the fluid containing compartment 124 upon compression of the piston member 136 within the pressure chamber 144.

One way resilient valve 146 allows pressurized fluid to pass through channel 148 into conduit 114 upon compression of trigger 132. Continued reciprocal motion of trigger 132 serves to fill tubular portion 150 of measuring chamber 116 with viscous fluid, driving multidose plunger 152 to its full retracted position. Referring to FIGS. 9 A–C, the multidose releasable measuring chamber 116 of the present embodiment comprises a tubular portion 150 having a multidimension plunger 152 mounted for reciprocal motion within tubular portion 150. As shown in FIG. 9A, plunger 152 includes a head portion 154 connected to a distal end of shaft 156. A driving tab 158 is positioned on the distal end of shaft 156. In the embodiment shown in FIGS. 9 A–B, the shaft 156 is configured to dispense either a full dose or a half dose depending on the angular orientation of plunger 152. Other ratios are readily within the scope of this invention and are within the skill of those in the art.

Shaft 156 is divided into approximately equal lengths with the distal length having an enlarged height relative to the proximal length. The overall thickness of the shaft in the X-direction is uniform along its length. Fork structure 160 is formed in housing 108 to receive plunger 152 therein. Fork structure 160 is dimensioned to be substantially equal to the width of shaft 156 (X-direction). In the upright position, shown in FIG. 9A (marked "F") the plunger 152 is permitted to fully retract, allowing for a full measured dose. Where driving tab 158 is rotated 90° (marked "H") plunger 152 is only permitted to retract approximated half its length thus allowing for a half of a full measured dose. This is because the shoulder portions 162 of the distal length of shaft 156 abut fork structure 160 and do not pass therethrough.

In operation, closure cap 120 is closed to seal atmospheric opening 118. Trigger 132 is compressed and released until a sufficient quantity of viscous fluid has been pumped through resilient one way valve 146 into conduit 114 filling measuring chamber 116. Thereafter, closure cap 120 is opened and plunger 152 is driven distally to expel a premeasure quantity of fluid. Alternatively, measuring chamber 116 may be removed from housing 108 and moved to a remote location for dispensing.

In each of the three embodiments discussed above, unmeasured dispensing may be accomplished by blocking the plunger from retracting and openihg the cap closure while the pressurized fluid is allowed to pass through the conduit. Thus, the entire reservoir may be emptied without the need to measure out a predetermined amount of fluid.

Referring to FIGS. 2 and 4, housing 22 and 64 respectively include a pivotal cover 164 which covers and protects a storage compartment 166 formed the housing. This storage compartment 166 is preferably dimensioned to retain a diaphragm or condom in a discrete and concealed location.

Although particular illustrative embodiments of the present invention have been described herein, the present invention is not limited to these embodiments. Various changes, substitutions and modifications may be made thereto by those skilled in the art without departing from the spirit or scope of the invention defined by the appended claims.

I claim:

1. A viscous fluid dispenser for dispensing both measured and unmeasured quantities of viscous fluid comprising:
    a housing having a dispensing conduit with an open proximal and distal end and a viscous fluid reservoir in communication with said conduit;
    self contained means for applying pressure to said fluid reservoir;
    a distinct collapsible measuring chamber for receiving and retaining a predetermined quantity of fluid, said chamber being retainable in said housing means and having a distal end thereof in communication with said dispensing conduit;
    valve means interposed between said reservoir and said measuring chamber; and
    closure means attached adjacent said conduit for selectively sealing said distal end of said conduit such that when said conduit is sealed and said self contained means for applying pressure is activated, a predetermined quantity of fluid fills said measuring chamber and when said conduit is open fluid is permitted to flow from the reservoir out to the distal end of said conduit.

2. A viscous fluid dispenser as in claim 1 wherein said self-contained means for applying pressure comprises a compressed spring assembly.

3. A viscous fluid dispenser as in claim 1 wherein said self-contained means for applying pressure comprises a piston and compressed spring assembly activated by a trigger pivotally attached to said housing means.

4. A viscous fluid dispenser as in claim 1 wherein said collapsible measuring chamber is releasably attached to said housing to permit remote discharge of a predetermined amount of fluid.

5. A viscous fluid dispenser as in claim 1 wherein said collapsible measuring chamber comprises a tubular portion having a plunger disposed therein for longitudinal movement therethrough.

6. A viscous fluid dispenser as in claim 5 wherein said plunger is dimensioned to dispense variable doses depending upon the angular rotational orientation of the plunger within said tubular portion.

7. A viscous fluid dispenser for dispensing both measured and unmeasured quantities of viscous fluid comprising:
    a housing;
    a pressurized fluid reservoir including a head portion dividing a fluid containing compartment from a pressure applying compartment disposed in said housing;
    a distinct collapsible measuring chamber releasably attached to said housing and including a tubular member having an opening in a distal end and a plunger disposed in a proximal end for reciprocal motion therein;
    a conduit formed in said housing having an atmospheric opening and interconnecting said fluid reservoir and
    said collapsible measuring chamber;
    valve means, disposed between said conduit and said reservoir for regulating the flow of said viscous fluid; and
    a closure cap for closing said atmospheric opening such that when said conduit is sealed and said pressurized fluid reservoir is in communication with said measuring chamber allowing fluid to flow into said measuring chamber, a predetermined quantity of fluid fills said measuring chamber and when said conduit is open, fluid is permitted to flow from the reservoir out to the distal end of said conduit.

8. A viscous fluid dispenser as in claim 7 wherein said pressurized fluid reservoir further includes resilient one-way valve means for refilling said reservoir after it has been discharged.

9. A viscous fluid dispenser as in claim 7 wherein said pressurized fluid reservoir is removable from said housing.

10. A viscous fluid dispenser as in claim 7 wherein said housing further comprises a storage compartment.

11. A viscous fluid dispenser as in claim 10 wherein said housing further comprises a pivotal cover enclosing said storage compartment.

12. A viscous fluid dispenser for dispensing both measured and unmeasured quantities of viscous fluids comprising:
- a housing;
- a fluid reservoir disposed in said housing;
- a pump assembly mounted in said housing for pressurizing fluid in said fluid reservoir;
- a distinct releasable measuring chamber disposed in said housing;
- a dispensing conduit formed in said housing, said conduit having an atmospheric opening at a distal end and providing a fluid connection between said fluid reservoir and said measuring chamber;
- valve means disposed in said housing between said fluid reservoir and said measuring chamber for restricting the flow direction of said fluid; and
- a closure cap attached adjacent said conduit for selectively closing said atmospheric opening of said conduit such that when said closure cap is closed and said pump assembly is actuated, a predetermined quantity of fluid fills said measuring chamber and when said closure cap is open, fluid is permitted to bypass said measuring chamber and to flow from the reservoir out of said atmospheric opening.

13. A viscous fluid dispenser as in claim 12 wherein said pump assembly includes:
- a trigger pivotally mounted to said housing;
- a piston mounted for longitudinal reciprocal motion from a distal to a proximal position within a pressure chamber; and
- resilient means for returning said piston to its distal position upon release of said trigger.

14. A viscous fluid dispenser for dispensing both measured and unmeasured quantities of viscous fluid comprising:
- a housing having a portion therein for housing a viscous fluid reservoir;
- means for applying pressure to said viscous fluid reservoir;
- a dispensing conduit formed in said housing, said conduit having an open proximal and distal end and communicating with said fluid reservoir;
- a distinct measuring chamber positioned in said housing in communicating with said fluid reservoir and said proximal end of said dispensing conduit for receiving and retaining a premeasured quantity of fluid from said reservoir, said measuring chamber having a dispensing opening therein;
- valve means positioned between said viscous fluid reservoir and said measuring chamber; and
- closure means for selectively sealing said distal end of said conduit such that when said conduit is sealed and pressure is applied to said reservoir, a predetermined quantity of fluid fills said measuring chamber and when said conduit is open fluid is permitted to flow from the reservoir out to the distal end of said conduit.

* * * * *